Figure 1:
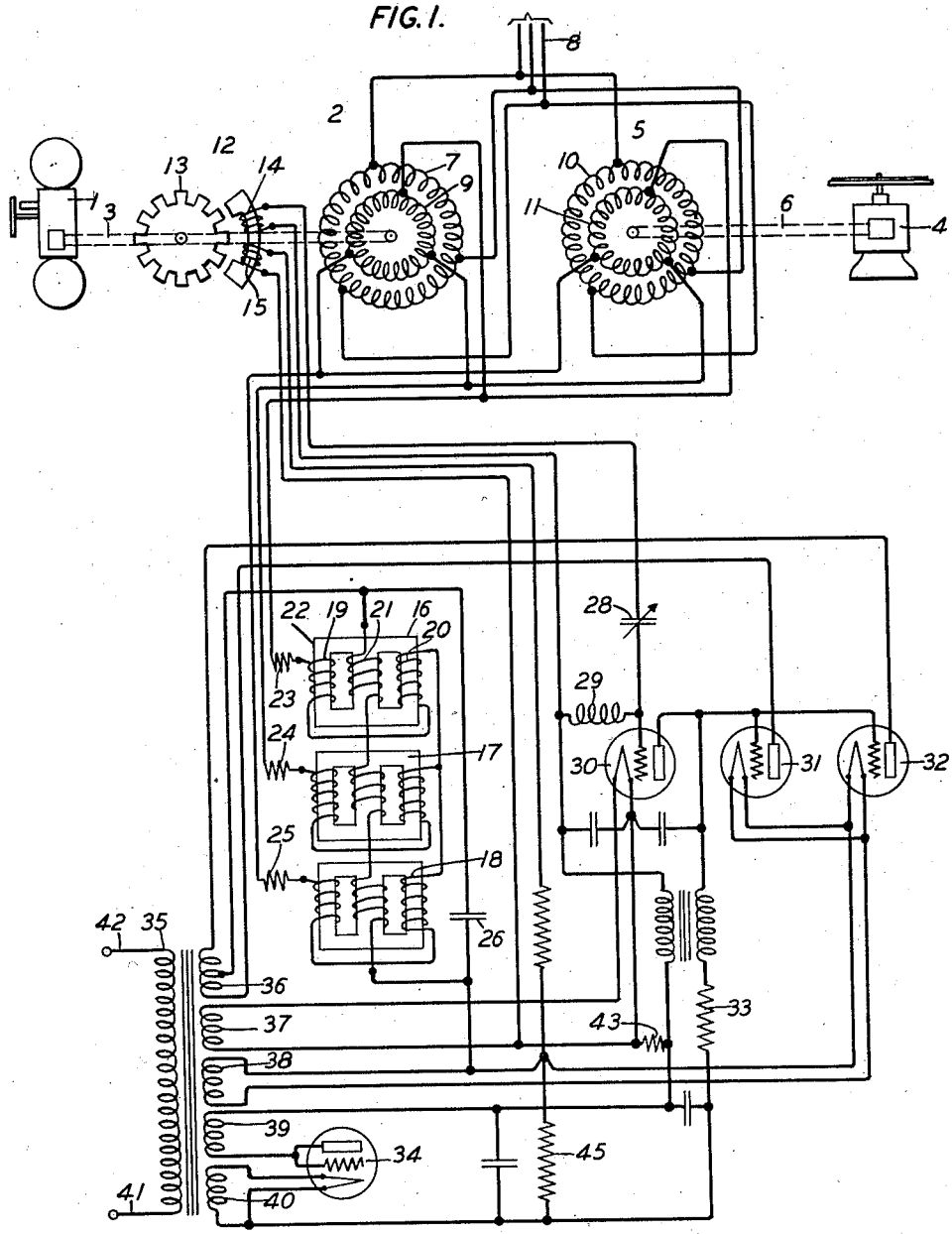

Patented Oct. 10, 1933

1,930,279

UNITED STATES PATENT OFFICE 1,930,279

MOTOR CONTROL SYSTEM

Edmund R. Morton, New York, N. Y., assignor to Bell Telephone Laboratories, Incorporated, New York, N. Y., a corporation of New York Application January 8, 1931. Serial No. 507,407

12 Claims. (Cl. 172—293)

This invention relates to control systems for governing the operation of electric motors and particularly to control systems for operating a plurality of motors synchronously at constant speed.

One object of the invention is to provide a control system for operating a plurality of motors synchronously at constant speed under the control of one of the motors.

Another object of the invention is to provide a control system having a plurality of motors electrically interlocked and connected to a supply circuit to operate synchronously and governed by one of the motors to operate synchronously at a constant speed.

A further object of the invention is to provide a control system for a plurality of motors mechanically separated and electrically interlocked that shall operate all motors synchronously and at constant speed under the control of a generator directly operated by one of the motors.

In reproducing sound pictures, it is essential to have the projector or motion picture machine operate synchronously with the sound reproducing machine in order to obtain good quality of sound pictures. It is customary at the present time to have the motion picture machine mechanically connected to the sound reproduction machine and operate both machines by a single constant speed motor. It is desirable in some cases to locate the motion picture machine remote from the sound reproduction machine on account of space limitations in the projection booth or on account of personnel problems. If the motion picture machine is located any appreciable distance away from the sound reproducing machine it is difficult to mechanically connect the two machines and operate them by a single motor so as to obtain good quality in the reproduced sound picture.

In a sound picture control system constructed in accordance with this invention the motion picture machine and the sound reproducing machine are operated by separate motors so that the machines may be located at any desired distance away from each other. The motors operating the motion picture machine and the sound reproducing machine are electrically interlocked and are controlled to operate synchronously at constant speed.

The term "synchronous" when used in describing the operation of the motors is to be understood as referring to the synchronous operation of the motors with respect to each other and not to the synchronous operation of the motors with respect to the frequency of any source of current.

In the preferred system constructed in accordance with the invention poly-phase wound rotor induction motors are provided for operating the motion picture machine and the sound reproducing machine. The rotor windings of the two induction motors are connected together in parallel circuit relation to effect electrical interlocking in the manner disclosed in the patent to C. J. A. Michalke, No. 684,579, dated October 15, 1901. Inductive elements of the type disclosed in the H. M. Stoller et al. Patent No. 1,662,083, dated March 13, 1928 and associated resistance elements are connected in parallel with the rotor windings of the induction motors for controlling the secondary current of such motors and accordingly the torque and speed thereof. The impedance of the inductive reactance elements connected in parallel with the rotor windings of the motors are preferably controlled by a regulator system of the type disclosed in the patent to H. M. Stoller et al., No. 1,662,083.

The pilot generator disclosed in the Stoller et al. patent is directly connected to one of the induction motors in order to generate current having a frequency which varies according to the speed of the induction motors. The impedance of the inductive reactance elements in parallel with the rotor windings of the induction motors is varied according to the frequency developed by the pilot generator. The resistance elements connected in parallel with the rotor windings of the induction motors are connected in series with the inductive reactance elements so that variation in the inductance of the inductive reactance elements controls the current flow through the resistance elements. The current flow through the resistance elements is so governed as to maintain the speed of the synchronously operated induction motors substantially constant.

If so desired the wound rotor induction motors may be governed by a control system of the type disclosed in the patent to H. M. Stoller et al., No. 1,756,573, dated April 29, 1930. Moreover, if so desired the induction motors having wound rotors may be replaced by alternating current repulsion motors of the type disclosed in the Stoller et al. Patent No. 1,756,573.

Figure 2:
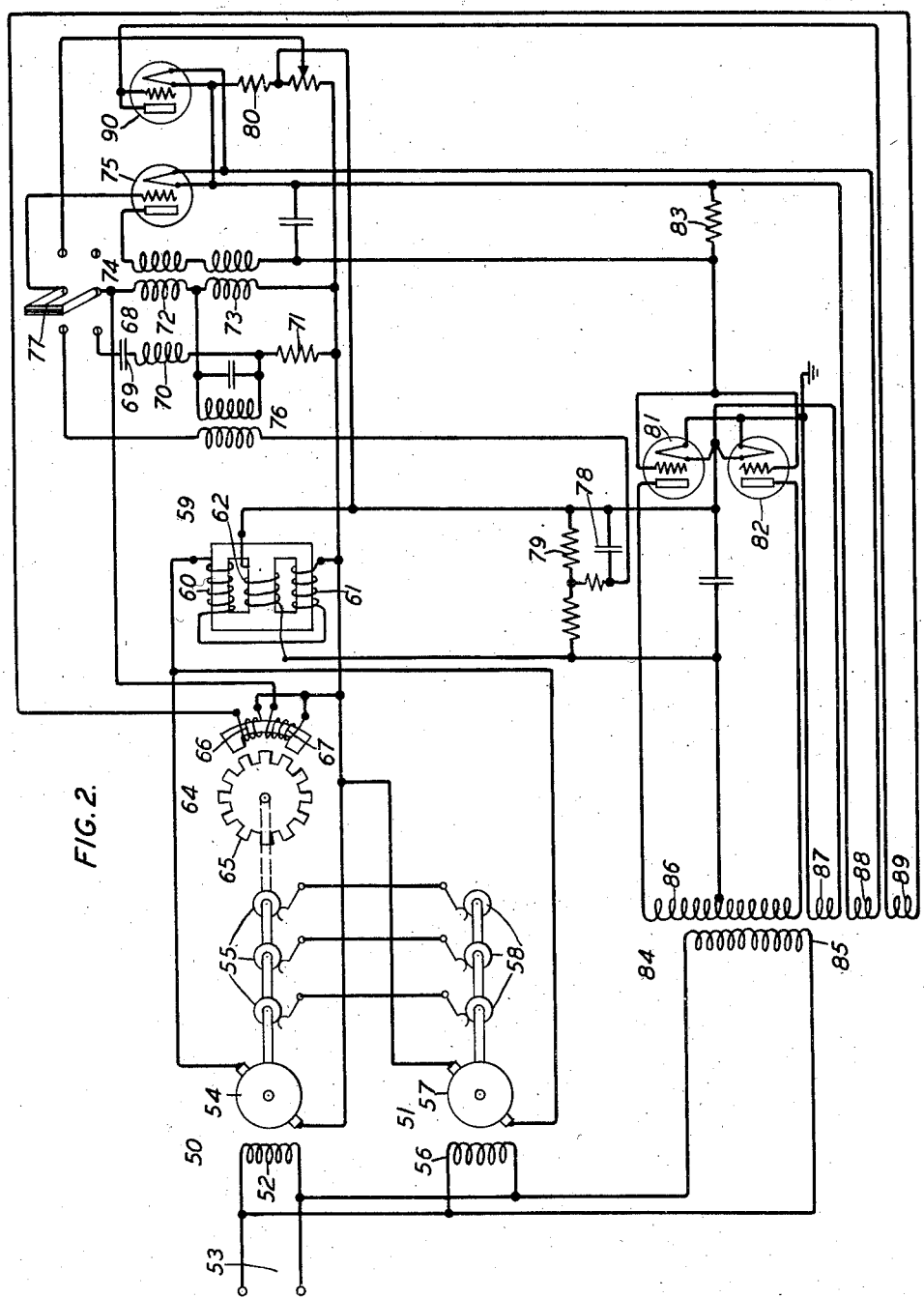

In the accompanying drawings Fig. 1 is a diagrammatic view of a control system employing wound rotor induction motors; and Fig. 2 is a diagrammatic view of a control system employing repulsion motors.

Referring to Fig. 1, a projector or motion picture machine 1 is shown directly connected to an induction motor 2 by means of a shaft 3 and a sound reproducing machine 4 is shown connected to an induction motor 5 by means of a shaft 6. The induction motor 2 comprises a stator winding 7 connected to a three-phase supply circuit 8 and a rotor winding 9. The induction motor 5 comprises a stator winding 10 which is connected to the three-phase supply circuit 8 and a rotor winding 11.

A pilot generator 12 of the repulsion type is mounted on the shaft 3 between the induction motor 2 and the projector 1. The pilot generator comprises a toothed rotor 13, an armature winding 14, and a field winding 15. The pilot generator 12 serves to control the inductive impedance of three inductive reactance elements 16, 17 and 18 by a regulator system of the type disclosed in the H. M. Stoller et al. Patent, No. 1,622,083.

The inductive reactance elements 16, 17 and 18 are similar in construction and operation to the inductive reactance elements disclosed in the Stoller et al. Patent, No. 1,662,083. Each of the inductive reactance elements comprises two alternating current windings 19 and 20 and a direct current winding 21, all mounted on the same core member 22. The current flow through the direct current windings of the inductive reactance elements is controlled according to the frequency developed by the pilot generator 12 for controlling the inductance of the inductive reactance elements and accordingly the current flow through the alternating current windings of the inductive reactance elements 16, 17 and 18. The alternating current windings of the inductive reactance elements 16, 17 and 18 are connected in series with resistance elements 23, 24 and 25 and in parallel with the rotor windings 9 and 11 of the induction motors 2 and 5. A condenser 26 is connected across the direct current windings of the inductive reactance elements for smoothing out any ripples in the current.

The regulator system employed for governing the inductive reactance elements 16, 17 and 18 according to the frequency of the current developed by the pilot generator 12 is fully disclosed in the H. M. Stoller, et al. Patent, No. 1,662,083. Accordingly only a brief disclosure of such regulator system will be given. The armature winding 14 of the pilot generator 12 is connected by a tuned circuit comprising a capacity element 28 and an inductive element 29 to the input circuit of a three-element detector tube 30. The tuned circuit comprising capacity 28 and inductance 29 is tuned to a frequency slightly above the frequency of the current developed by the pilot generator 12 when the induction motors 2 and 5 are operating at normal speed. The detector tube 30 is coupled to two rectifier amplifier tubes 31 and 32 by means of a coupling resistance 33. The direct current windings of the inductive reactance elements 16, 17 and 18 are connected to the output circuits of the rectifier amplifier tubes 31 and 32.

A transformer comprising a primary winding 35 and five secondary windings 36 to 40, inclusive, is connected to a suitable alternating supply circuit by conductors 41 and 42. The secondary winding 36 supplies alternating plate potential to the rectifier amplifier tubes 31 and 32. The secondary winding 37 supplies heating current to the detector tube 30. The secondary winding 38 supplies heating current to the rectifier amplifier tubes 31 and 32. The secondary winding 39 supplies plate potential to rectifier tube 34 and the secondary winding 40 supplies heating current to the filament of the rectifier tube 34.

The rectifier tube 34 supplies grid polarizing potential to the detector tube 30 by means of a resistance element 43, plate potential to the detector tube 30 and current for exciting the field winding 15 of the pilot generator 12.

The connecting of the rotor windings 9 and 11 in parallel circuit relation serves to insure that the two motors will operate in synchronism with each other. The placing of the resistance elements 23, 24 and 25 in parallel with the rotor windings of the motors serves to control the slip according to the resistance value of such elements. The current through the resistance elements is controlled by the inductive impedance elements 16, 17 and 18. The torque of the motors 2 and 5 is so controlled by varying the impedance of the inductive reactive elements 16, 17 and 18 as to maintain the speed of the motors substantially constant.

If the motors 2 and 5 tend to operate below normal speed the frequency of the current developed by the pilot generator 12 will tend to be lowered. A decrease in the frequency of the current supplied by the pilot generator 12 will reduce the voltage across the inductance 29 which is coupled to the input circuit of the detector tube 30. The voltage impressed upon the grid of the detector tube 30 is lowered, and the current flow through the detector tube is lowered. Consequently the grids of the two rectifier amplifier tubes 31 and 32 are at a somewhat less negative potential than the filaments due to the potential drop across a resistance element 45. The space current flowing through the rectifier amplifier tubes is therefore large and accordingly the current flow through the direct current windings of the inductive reactors 16, 17 and 18 is increased. The impedance of the inductive reactance elements is lowered to increase the current flow through the resistance elements 23, 24 and 25. The increased current flow through the resistance elements 23, 24 and 25 increases the torque of the induction motors 2 and 5 to increase the speed thereof.

In case the induction motors 2 and 5 tend to operate above normal speed the frequency of the current developed by the pilot generator 12 tends to increase. The increased frequency of the pilot generator current raises the potential impressed upon the grid of the detector tube 30. An increased current flow through the detector tube is effected which increases the negative potential on the grids of the rectifier amplifier tubes 31 and 32. The current flow through the direct current windings of the inductive reactance elements 16, 17 and 18 is lowered to increase the impedance of such elements. Consequently the current flow through the resistance elements 23, 24 and 25 is lowered to lower the torque of induction motors 2 and 5 and lower the speed thereof.

In a system constructed as above set forth it will be noted that there is no mechanical connection between the projector 1 and the sound reproducing machine 4. However, the induction motors 2 and 5, which respectively operate the projector and the sound reproducing machine, are electrically interlocked so as to rotate synchronously. Furthermore the two motors are controlled in accordance with the frequency of the pilot generator 12 to operate synchronously at constant speed. Although only two induction motors 2 and 4 are shown connected in the system it is to be understood that a greater number of motors could be so operated if desired.

Referring to Fig. 2 of the drawings, two alternating current repulsion motors 50 and 51 are shown for respectively operating a projector or motion picture machine and a sound reproducing machine (not illustrated). The motors 50 and 51 are assumed to be directly connected to the projector and the sound reproducing machine in the manner disclosed in Fig. 1 of the drawings. The repulsion motor 50 comprises a primary winding 52 connected to a single phase supply circuit 53 and a wound rotor having a commutator 54 and slip rings 55 which are connected to the rotor winding.

The repulsion motor 51 comprises a primary winding 56 which is connected to the supply circuit 53 and a rotor or secondary winding connected to a commutator 57 and three slip rings 58. The slip rings 58 are directly connected to the slip rings 55 of the repulsion motor 50 in order to interlock the two motors in the manner disclosed in the patent to C. J. A. Michalke 684,579.

An inductive reactance element 59 having two alternating current windings 60 and 61 and a direct current winding 62 is provided for controlling the impedance of the circuits connected to the brushes engaging the commutators 54 and 57 of the repulsion motors 50 and 51. The inductive impedance element 59 is of the type disclosed in the patent to H. M. Stoller et al., No. 1,662,083, or in the patent to H. M. Stoller et al., No. 1,756,573. The impedance of the inductive reactance element 59 is controlled by a regulator system of the type disclosed in the H. M. Stoller et al. Patent, No. 1,756,573. The speed of the two repulsion motors 50 and 51, which are interlocked to operate synchronously, is controlled according to the impedance of the inductive reactance element 59.

A pilot generator 64 is directly operated by the repulsion motor 50 in order to develop alternating current having a frequency varying according to the speed of the repulsion motors 50 and 51. The pilot generator 64 which is of the induction type comprises a toothed rotor 65, a field winding 66 and an armature winding 67. The armature winding 67 is connected to opposite vertices of a Wheatstone bridge circuit 68. The Wheatstone bridge circuit comprises a tuned arm embodying a capacity element 69 and an inductive element 70, a resistance arm 71 and two arms 72 and 73 which comprise the primary winding of a transformer 74. The secondary winding of the transformer 74 is connected to the plate circuit of a phase detector tube 75.

An output transformer 76 is provided for connecting the Wheatstone bridge circuit 68 to the input circuit of the phase detector tube 75. The primary winding of the transformer 76 is connected to the two vertices of the Wheatstone bridge circuit opposite to the vertices connected to the armature winding of the pilot generator 64. The input circuit for the phase detector tube 75 which is connected to the secondary winding of transformer 76 may be traced from the grid of the phase detector tube 75 through one arm of the two-pole switch 77 which is assumed closed towards the left as shown in Fig. 2 of the drawings, secondary winding of the transformer 76, capacity element 78 in parallel with resistance elements 79 and a potentiometer 80 to the filament of the phase detector tube.

The phase detector tube 75 is coupled to two rectifier amplifier tubes 81 and 82 by means of a resistance element 83. The output circuits for the rectifier amplifier tubes 81 and 82 are connected to the direct current winding of the inductive reactance element 59.

A transformer 84 having a primary winding 85 and secondary windings 86 to 89, inclusive, is connected to the supply circuit 53 for supplying alternating plate potential to the rectifier amplifier tubes 81 and 82, heating current for the tubes 81 and 82, heating current for the phase detector tube 75 and rectifier tube 90 and plate potential for the rectifier tube 90. The rectifier tube 90 supplies current to the pilot generator field winding 66. The potentiometer 80 which is connected to the rectifier 90 supplies grid biasing potential to the phase detector tube 75. The two-pole double-throw switch 77 is closed to the left, as viewed in Fig. 2 of the drawings, when constant speed operation of the repulsion motors is desired and is closed to the right when control at will of the motor speed is desired. When the double-throw switch 77 is closed to the right, variable speed operation of the repulsion motors is effected by controlling the potentiometer 80 to vary the grid bias on the phase detector tube 75. The capacity element 78 and the resistance elements 79 serve to effect a feed-back on the grid of phase detector tube 75 in the manner disclosed in the patent to H. M. Stoller 1,663,890, dated March 13, 1928. This feed-back serves to compensate the regulator and to hold the speed substantially constant without any hunting action.

The tuned arm of the Wheatstone bridge circuit is assumed to be tuned to the frequency developed by the pilot generator when the repulsion motors are operating at normal speed. Assuming the switch 77 to be closed towards the left, as viewed in Fig. 2 of the drawings, a tendency of the repulsion motors 50 and 51 to operate at lower speed will tend to reduce the frequency of the current developed by the pilot generator 64. The reduction in the frequency of the current developed by the pilot generator will unbalance the Wheatstone bridge circuit due to the fact that the capacity reactance of the condenser 69 will exceed the inductive reactance of inductance 70 of the resonant arm. It is assumed that the Wheatstone bridge circuit is balanced when the pilot generator is operated at normal speed. The transformer 76 will deliver a large output voltage to the grid of the detector tube 75. The plate of the phase detector tube 75 is supplied with alternating current from the pilot generator by the transformer 74 which is so poled that when the frequency of the generator current is below the bridge balance the grid of the phase detector tube is negative at the same time that the plate has a positive potential impressed thereon. Accordingly during the half cycle in which the detector can pass space current the output of the transformer 76 drives the grid of the detector tube further negative and therefore very little space current can pass through the detector tube. It is therefore apparent that very little potential drop will be produced across the coupling resistance 83 and the grids of the rectifier amplifier tubes 81 and 82 will remain positive under the control of the potentiometer 80. This will produce a large space current flow through the rectifier amplifier tubes 81 and 82 and consequently a large current flow through the direct current winding of the inductive reactance element 59. Consequently the alternating current winding of the inductive reactance element will offer small impedance to the flow of current therethrough from the rotors of the repulsion motors 50 and 51. Consequently the speed of the repulsion motors 50 and 51 will tend to increase.

If the speed of the repulsion motors 50 and 51 tends to rise above normal value the frequency of the current developed by the pilot generator 64 will tend to increase to so control the phase detector tube 75 and the rectifier amplifier tubes 81 and 82 as to decrease the current flow through the direct current winding of the inductive reactance element 59. This decreases the current flow through the alternating current windings to decrease the speed of the motors. A complete description of the operation of the phase detector tube 75 and the rectifier amplifier tubes 81 and 82 under the control of the pilot generator 64 for governing the inductive reactance element is given in the H. M. Stoller et al. Patent 1,756,573 and a further description thereof is deemed unnecessary.

Modifications in the systems and in the arrangement and location may be made within the spirit and scope of the invention and such modifications are intended to be covered by the appended claims.

What is claimed is:

1. In a control system, an alternating current supply circuit, a plurality of dynamo-electric machines having stator windings connected in parallel circuit relation and rotor windings connected in parallel circuit relation, one group of said parallelly related windings being connected to said supply circuit, and means controlled by one of said machines for governing the parallelly related windings which are not connected to the supply circuit to operate all the machines synchronously at constant speed.

2. In a control system, a three-phase supply circuit, a plurality of motors having three-phase stator windings connected in parallel to said supply circuit and three-phase rotor windings connected in parallel circuit relation, and means controlled by one of said motors for automatically varying the impedance of the motor rotor circuits.

3. In a control system, a supply circuit, a plurality of motors connected to said supply circuit, means for electrically interlocking said motors to effect synchronous movement of all motors in accordance with the movement of one motor, and means operated by one of said motors for controlling all of said motors to maintain the speed thereof constant.

4. In a control system, a supply circuit, a plurality of motors connected to said supply circuit, means for electrically interlocking said motors to effect synchronous movement of all motors in accordance with the movement of any of said motors, means operated by one of said motors for developing a current having a frequency varying according to the speed of the motor, and means governed according to the frequency of said developed current for maintaining the speed of said motors constant.

5. In a control system, a three-phase supply circuit, a plurality of motors having three-phase stator windings connected in parallel to said supply circuit and three-phase rotor windings connected in parallel circuit relation, impedance means connected in parallel to said rotor windings to effect induction motor operation by the motors, and means controlled by one of said motors for governing said impedance means to maintain the speed of the motors constant.

6. In a control system, a plurality of dynamo-electric machines having stator and rotor windings, the stator windings being connected in parallel to a source of alternating current and the rotor windings being connected in parallel circuit relation, impedance means connected in parallel with said rotor windings, and means controlled by one of said machines for governing said impedance means to operate all of said machines synchronously and at constant speed.

7. In a control system, a poly-phase supply circuit, a plurality of motors having poly-phase stator windings connected in parallel to said supply circuit and rotor windings connected in parallel circuit relation, inductive reactance means connected in parallel to said rotor windings, and means controlled by one of said motors for governing said impedance means to maintain the speed of the motors constant.

8. In a control system, a poly-phase supply circuit, a plurality of motors having poly-phase stator windings connected in parallel to said supply circuit and rotor windings connected in parallel circuit relation to effect synchronous movement of all motors in accordance with the movement of any of the motors, inductive reactance means connected in parallel circuit relation to said rotor windings, a pilot generator connected to one of said motors for generating an alternating current, and means operated according to the frequency of the pilot generator current for governing said inductive reactance means to maintain the speed of the motors constant.

9. In a control system, a three-phase supply circuit, a plurality of motors having three-phase stator windings connected in parallel to said supply circuit and three-phase rotor windings connected in parallel circuit relation, inductive reactance means connected in parallel with said rotor windings to control the speed of said motors, a pilot generator connected to one of said motors for developing an alternating current having a frequency varying according to the speed of the motors, and means operating according to the frequency of the current developed by said pilot generator for governing said reactance means to maintain the motor speed constant.

10. In a control system, an alternating current supply circuit, a plurality of motors having stator windings connected in parallel to said supply circuit and rotor windings connected in parallel circuit relation, impedance means comprising resistance and inductive elements connected in parallel to said rotor windings, and means controlled by one of said motors for governing said impedance means to operate said motors at constant speed.

11. In a control system, an alternating current supply circuit, a plurality of motors connected to said supply circuit, means for electrically interlocking said motors to effect synchronous movement of all motors in accordance with the movement of one motor, a generator operated by one of said motors for generating a current having a frequency varying according to the motor speed, and means governed according to the frequency of the generator current for maintaining the speed of the motors constant.

12. In a control system, an alternating current supply circuit, a plurality of motors having stator windings connected in parallel to said supply circuit, means for electrically interlocking the rotor windings of said motors to effect synchronous movement of all motors in accordance with the movement of one motor, impedance means comprising resistance and inductive elements connected to said rotor windings, and means controlled by one of said motors for governing said impedance means to maintain the speed of the motors constant.

EDMUND R. MORTON.